United States Patent [19]
Otsuki et al.

[11] 3,789,090
[45] Jan. 29, 1974

[54] PROCESS FOR THE PRODUCTION OF CONJUGATED DIENE LIQUID POLYMERS

[75] Inventors: Yutaka Otsuki, Kawasaki; Hajime Hara, Fujisawa; Nobuo Imai, Kawasaki, all of Japan

[73] Assignee: Nippon Oil Co., Ltd., Tokyo, Japan

[22] Filed: June 4, 1970

[21] Appl. No.: 43,588

[30] Foreign Application Priority Data
June 14, 1969 Japan.............................. 44-46731

[52] U.S. Cl. 260/669 P, 260/94.2 M, 260/683.15 E
[51] Int. Cl. ....... C07c 15/10, C08d 3/04, C08f 3/16
[58] Field of Search... 260/683.15 E, 669 P, 94.2 M

[56] References Cited
UNITED STATES PATENTS

| | | | |
|---|---|---|---|
| 3,084,084 | 4/1963 | D'Alelio...................... | 260/94.2 M |
| 3,306,949 | 2/1967 | Mertzweiller et al. .... | 260/94.2 M X |
| 3,110,706 | 11/1963 | Vollmert et al. .......... | 260/94.2 M X |
| 3,360,580 | 12/1967 | Mertzweiller et al. .......... | 260/669 P |
| 2,527,768 | 10/1950 | Schulze et al. ................. | 260/669 P |
| 2,631,175 | 3/1953 | Crouch............................ | 260/669 P |
| 2,751,426 | 6/1956 | Classon et al. .............. | 260/683.15 E |
| 3,091,653 | 5/1963 | Nogradi........................ | 260/94.2 M |
| 3,325,558 | 6/1967 | George et al................... | 260/669 P |

FOREIGN PATENTS OR APPLICATIONS
876,587 9/1961 Great Britain.................. 260/94.2M OTHER PUBLICATIONS
Chemical Abstracts, Vol. 57, 6095c–f (1962).
Chemical Abstracts, Vol. 57, 12689d–f (1962).

*Primary Examiner*—Daniel E. Wyman
*Assistant Examiner*—H. M. S. Sneed
*Attorney, Agent, or Firm*—Nolte and Nolte

[57] ABSTRACT

A process is disclosed for the production of liquid polymers by polymerizing conjugated diolefins or copolymerizing these diolefins with vinyl compounds in the presence of particularly organosodium catalysts, where the resulting polymers are controlled in the desired average molecular weight and have very low color.

6 Claims, No Drawings

PROCESS FOR THE PRODUCTION OF CONJUGATED DIENE LIQUID POLYMERS

This invention relates to a process for the production of liquid polymers of controlled lower molecular weight, more particularly to the production of such conjugated diene liquid polymers of low color as may result from the polymerization of conjugated diolefins such as butadiene and isoprene, or from the co-polymerization of these diolefins with vinyl compounds such as styrene and alpha-methylstyrene in polymerization-inert hydrocarbon solvents in the presence of chain transfer agents and certain organosodium catalysts.

More specifically, the invention is directed to an improved process for polymerizing conjugated dienes of the class mentioned in suitable hydrocarbon solvents and in the presence of chain transfer agents and a polymerization initiator consiting of organosodium compounds represented by the general formula:

$$Ar-CR_1R_2Na$$

where Ar is an aryl group, and $R_1$ and $R_2$ are either hydrogen or alkyl group, the polymerization being conducted under controlled reaction conditions, particularly concentrations of the initiator, chain transfer agent and monomer, quantity of solvent, and temperature such that the resulting liquid polymer may have the average molecular weight controlled in the range of 500–10,000 and may be substantially colorless.

Liquid polymers of low molecular weight obtainable by polymerizing such conjugated dienes as butadiene, isoprene and the like are characterized by the presence of a magnitude of unsaturated bonds in their molecule and hence find particular application in the fields of thermosetting resins, drying oils, sealants, print coatings, rubber compounding as well as reactive intermediate products. However, they need to possess a fluidity characteristic i.e., viscosity adapted to the specific choice of application, and this characteristic is largely dependent upon the molecular weight of the polymer produced. Commercially valuable liquid polymers of such controlled molecular weight have been eagerly sought but found difficult to produce on an economically feasible scale. Numerous processes have been proposed to achieve the production of such commercially acceptable liquid polymers, but have involved a variety of problems.

An example of the processes employed in the art is known as a "living polymer" process wherein the polymerization is effected in tetrahydrofuran solvent to achieve most closely controlled degree of polymerization. This process necessarily involves the use of extravagant quantities of catalyst and costly tetrahydrofuran solvent.

Another prior-art process for the production of liquid polymers is desclosed in U.S. Pat. No. 2,631,175 wherein finely divided sodium metal is reacted with butadiene in a polymerization-inert hydrocarbon solvent such as benzene and hexane to form butadiene sodium, i.e., polymerization initiator, followed by addition of a butadiene feed. This process is not entirely satisfactory in that the degree of polymerization of product polymers produced under a given set of reaction conditions are not well consistent and difficult to control in the desired range. Later improvements have been suggested as in U.S. Pat. No. 2,762,851 with a view to eliminate such difficulties by the use of isopropyl alcohol or dioxane and as in U.S. Pat. No. 3,325,558 wherein the reaction is carried out at elevated temperature to form an initiator prior to the charging of monomers. These processes provide somewhat improved consistency of the average molecular weight of the polymers but still have a difficulty in controlling the fluidity or viscosity of the desired liquid polymers possibly due to occurence of the initiator forming reaction concomitant with the polymerization reaction.

Another known process as in U.S. Pat. No. 3,360,580 employs a complex of sodium and napthalene, anthracene or similar activators for initiating the polymerization in tetrahydrofuran or other ether solvents of conjugated diolefins such as butadiene, with the rate of the polymerization initiator held constant. This process cannot be carried out successfully unless highly expensive ether solvents such as tetrahydrofuran are used.

Another liquid polymer production is known in which conjugated diolefins such as butadiene and isoprene are polymerized in the presence of a polymerization initiator consisting of organolithium compounds such as n-butyllithium. Such process (e.g., disclosed in Japanese Patent Publication No. 38-26,592) requires considerable amounts of costly lithium metal as initiator and hence is not commercially advantageous.

While it is true that conjugated dienes such as butadiene and isoprene may be actively polymerized in suitable hydrocarbon solvents particularly in the presence of alfine-catalysts prepared from the reaction of finely divided sodium, isopropylalcohol, n-alkylchloride and propylene, the chain transfer may not be effected with use of ordinary anion polymerization chain transfer agents, resulting in polymers of extremely high molecular weight. Alkylsodium such as n-butylsodium and n-amylsodium is known to be effective in promoting the polymerization of butadiene and isoprene in suitable polymerization-inert hydrocarbon solvents, but the resulting polymers would be considerably colored and commercially less valuable.

Organosodium compounds having sodium particle directly coupled to benzene nucleus such as phenylsodium and p-biphenylsodium are not adequate for the purpose of initiating the polymerization of such conjugated dienes as butadiene, isoprene and the like, because their initiating activity, if at all, would be extremely slow.

Whereas, it is an object of the present invention to provide an improved, useful process for the production of liquid polymers which will eliminate the above-noted difficulties of the various prior-art processes.

A more specific object of the invention is to provide liquid polymers of controlled lower molecular weight and of very low color.

Another object is to provide improvements in the polymerization of conjugated dienes whereby liquid polymers of substantially uniform molecular weight may be obtained.

These and other objects and advantages of the invention will become apparent to those skilled in the art from the following description taken in conjunction with certain specific embodiments of the invention.

It has now been dicovered and ascertained that the desired liquid polymers of conjugated dienes may be obtained particularly in the presence of a polymerization initiator consisting of such organosodium compounds which may be represented by the general formula Ar-$CR_1R_2$Na (Ar: aryl group, and $R_1$, $R_2$: hydrogen or alkyl group). This is accomplished by the use of relatively inexpensive hydrocarbon solvents without resort to highly expensive ethers. It has also been found and proven that liquid polymers of such controlled molecular weight and color as may be of high commercial value may be obtained with substantially consistent results by regulating the concentration of initiator, of chain transfer agent and of monomer under a selected set of reaction conditions.

The polymerization initiator according to the invention may be prepared from the transmetalation of alkylaryl compounds which may be represented by the general formula:

where Ar is aryl group, and R,R' is hydrogen or alkyl group, and organosodium compounds which may be represented by the general formula:

R''Na where R'' is alkyl group or phenyl group.

The liquid lower polymers to which the invention is directed may include usually desirable butadiene polymers, conjugated diene polymers such as of 2,3-dimethyl-1,3-butadiene, isoprene and piperylene, and may further include copolymers of two or more conjugated dienes, or copolymers of one or more conjugated dienes with one or more anion-polymerization active vinyl monomers. The monovinyl monomers having an anion-polymerization activity include styrene, alkylstyrenes, alpha-methylstyrene, vinylnaphthalene and also acrylic acid, substituted acrylic acids and their esters.

The term liquid lower polymers of the invention include normally liquid polymeric materials having the average molecular weight of generally between 300 and 10,000, preferably between 500 and 5,000.

The polymerization-inert hydrocarbon solvents employed in the process of the invention include preferably relatively lower alkyl hydrocarbons such as benzene, pentane and hexane, and exclude alkylaryl hydrocarbons as these tend to act as chain transfer agent. Higher hydrocarbons are not suitable because such solvents due to their high boiling point are difficult to remove from the polymers.

The chain transfer agents required by the process of the invention may be alkylaryl compounds which may be represented by the general formula:

A'r—CR$_3$R$_4$H where A'r is aryl group, and R$_3$, R$_4$ is hydrogen or alkyl group. These compounds may preferably include toluene, xylenes, ethylbenzene, cumene, mesitylene, durene and the like, but such compounds as may have a halogen, nitrile or hydroxyl group are not desirable as they tend to react with the polymerization initiators employed in accordance with the invention.

The polymerization reaction per se would take place at temperatures ranging widely from −80° to 100°C. Too low a temperature would result in slower polymerization, whereas as the temperature is increased improperly, polymers of high color are obtained. It is desired, therefore, that the temperature be in the range of 0°–80°C. The pressure under which the process is carried out is not particularly limiting but should preferably be such that the above temperature range be maintained.

For better results, it is essential according to the invention that the concentration of initiator be of the order of 0.01–0.5 mol/liter of reaction mixture, that of chain transfer agent be of the order of 0.001–30 mols, and that of monomer be of the order of 5–400 grams. These concentration factors play an important part of the process of the invention and have a bearing upon the molecular weight or polymerization degree of polymers. In other words, the molecular weight of liquid polymers has been found to be closely related to and variable with any one of the three factors. If either of the three is varied while the remaining two factors are fixed, polymers of different molecular weights may be obtained. However, with any such chosen concentration factor, it is important that each concentration be in the range specified hereinabove, so as to ensure production of liquid polymers of such controlled molecular weight as in the range of 500 to 10,000 and of commerically acceptable color.

With initiator concentration below 0.01 mol per liter of mass, the molecular weight of polymers increases in excess of the upper limit of the range, and the yield of desired polymers declines. Conversely, initiator concentration exceeding 0.5 mol would result in the formation of undesirably increased molecular weight polymers and in pronounced temperature rise affecting the uniform reaction progress. Besides, the use of such large quantities of initiator is literally disadvantageous.

The concentration of chain transfer agent lower than 0.001 mol per liter of mass would result in incomplete chain transfer and hence in polymers of extremely high molecular weight. Greater concentration of this agent than 30 mols would cause too fast transfer reaction with the result of considerable polymers of lower molecular weight than desired.

It is likewise true that monomer concentrations less than 5 grams per liter of reaction mixture would result in the formation of unduly low molecular weight polymers and in less polymers than otherwise obtainable for a given set of reaction vessel. Any rate of monomers exceeding 400 grams would give large amounts of polymers of increased concentration of the resulting polymers where viscosity of the mixture in the reactor increases and inhibits uniform polymerization of the monomers, and the temperature of the system becomes difficult to control.

The molecular weight, i.e., degree of polymerization of liquid polymers produced according to the invention may be determined by the following formula:

$$DP = \frac{\int kp[P^*][M]dt}{[P^*] + \int Ktr[P^*][T]dt}$$

where DP is polymerization degree; (P*) is initiator concentration; (M) is monomer concentration; (T) is concentration of chain transfer agent; Kp is growth speed constant; and Ktr is chain transfer speed constant.

Accordingly, certain optional conditions, viz. (P*), (M) and (T) factors, which should be in the range above specified, may be tested in advance so as to determine the Kp and Ktr constants and may then be selected such that liquid polymers of the desired molecular weight may be obtained. Proper reaction conditions selected in accordance with the above molecular weight determination formula provide a commercially valuable class of liquid polymers having closely controlled molecular weight and substantially consistent product quality.

The following examples are utilized to explain certain features of the present invention, and they are to be regarded in an illustrative, but not limiting sense.

EXAMPLE I

A mixture of 5.8 grams (0.25 mol) sodium dispersion, 55.2 grams (0.6 mol) toluene and 400 milliliters benzene was charged in a dry nitrogen atmosphere to a two-liter autoclave equipped with a stirrer. 100 milliliters benzene solution with 11.3 grams (0.1 mol) chlorobenzene dissolved therein was introduced in droplets into the autoclave at a temperature of 25°–30°C over a period of 30 minutes, and the stirrer was started and continued to operate for one hour. The reaction mixture was then heated to a temperature of 80°C and stirred for a period of two hours. There was 0.1 mol benzylsodium formed and present in the reaction mixture, and about 0.5 mol toluene found unreacted. 1 liter benzene was added as solvent, and the reaction temperature was reduced to and maintained at 30°C, at which temperature 540 grams butadiene was allowed to polymerize over a period of four hours. To the resulting polymer solution was added 16 grams methanol, and the polymerization was terminated. The polymer solution was then washed with 2 liters 0.1 normal hydrochloric acid, then with water several times and it was thereafter subjected to distillation thereby producing 450 grams polymer. This polymer had an average molecular weight of 920, a viscosity of 25 poise (25°C) and a color of 1+ Gardner or very pale.

In order to ascertain the possibility of consistent results throughout several of these experiments under similar conditions, the Example I procedure was repeated. The results of each set of experiment are illustrated below.

TABLE I

| Experiment number | Polymer yield (g.) | Average molecular weight | Viscosity poise (25°C) | Color (Gardner) |
|---|---|---|---|---|
| 1 | 456 | 925 | 25 | 1+ |
| 2 | 440 | 910 | 23 | 1 |
| 3 | 450 | 920 | 25 | 1 |
| 4 | 445 | 915 | 24 | 1 |
| 5 | 460 | 925 | 26 | 1+ |

For purposes of comparison, another experiment was carried out in which a mixture of 4.6 grams (0.2 mol) sodium dispersion, 46 grams (0.5 mol) toluene and 1 liter benzene was charged to the reactor and the temperature was held at 30°C at which 300 grams butadiene was added for polymerization with stirring. There was obtained a very small amount of polymer, because the organosodium, which would result from the reaction of butadiene and sodium metal and act as a polymerization initiator, was believed to have been formed only too slow at such low temperature.

COMPARING EXAMPLE I 0.1 mol phenylsodium was prepared from the reaction of sodium with chlorobenzene for use as a polymerization initiator in the process illustrated in EXAMPLE I. In the presence of this initiator, 540 grams butadiene was polymerized but there was obtained only 50 grams desired polymer. This was obviously attributable to the fact that the phenylsodium initiator is considerably inferior in the polymerization activity to arylalkyl sodium such as benzylsodium.

COMPARING EXAMPLE 2

0.1 mol n-amylsodium was prepared by reacting sodium with n-amylchloride. It was used as an initiator for the polymerization of 540 grams butadiene in the manner illustrated in EXAMPLE I. There was obtained 310 grams polymer, but this polymer was objectionably colored (10 by Gardner).

EXAMPLES II–VI

A mixture of 51 grams (2.2 mols) sodium dispersion, 184 grams (2 mols) toluene and 552 grams benzene was charged in a dry nitrogen atmosphere to a 2-liter, three neck distillation flask. 100 grams benzene solution with 113 grams (1 mol) chlorobenzene dissolved therein was added in droplets over a period of one hour, where the reaction temperature was held at 25°–30°C. The reaction mixture was stirred at a temperature of 30°C for a period of two hours, thereafter heated to a temperature of 80°C and continued to be stirred for additional three hours. 100 grams reaction solution was analyzed to reveal the presence of 0.1 mol benzylsodium and 0.1 mol toluene.

Added to 100 grams of the resulting reaction solution was additional 1.4 liters benzene for the polymerization of 540 grams butadiene which was carried out as in EXAMPLE I. Several of these experiments were conducted under similar conditions, except that the rate of toluene was varied while the catalyst and monomer concentrations were held constant. The results of these cycles of experiment were illustrated in Table 2 below, from which it has been found that the molecular weight of polymers may be closely controlled by the rate of toluene acting as a chain transfer agent.

TABLE 2

| Example No. | 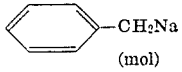—CH₂Na (mol) | 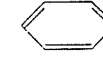—CH₃ (mol) | Butadiene feed (g.) | Polymer yield (g.) | Average molecular weight | Viscosity poise (25° C.) | Color (Gardner) |
|---|---|---|---|---|---|---|---|
| II | 0.1 | 1 | 540 | 420 | 2,000 | 180 | 2 |
| III | 0.1 | 2 | 540 | 410 | 1,600 | 65 | 1+ |
| IV | 0.1 | 5 | 540 | 430 | 960 | 25 | 1+ |
| V | 0.1 | 7 | 540 | 400 | 720 | 11 | 1 |
| VI | 0.1 | 10 | 540 | 460 | 580 | 2 | 1 |

EXAMPLE VII 0.1 mol n-butylsodium was prepared from the reaction of n-butylchloride and sodium dispersant, to which was added 64 grams ethylbenzene in a dry nitrogen atmosphere, and the whole was stirred at 30°C for a period of three hours. It was ascertained that the formation of

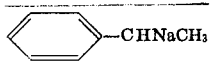

was substantially constant with respect to the amount of n-butylsodium, with unreacted ethylbenzene present in the reaction mixture. Benzene was added in an amount to make 1.5 liters mass, followed by introduction of 680 grams isoprene at 40°C at a constant speed over a period of four and half hours. The polymerization was discontinued by adding 12 grams methanol to the polymer solution. Carbonic gas was charged under pressure to the polymer solution, which was then stirred at 30°C for 30 minutes, thereafter filtrated and distilled thereby producing 520 grams polymer. This polymer was examined to have an average molecular weight of 1,200 and a color of 3 by Gardner.

EXAMPLE VIII

A mixture of 10 mols n-amylsodium prepared from the reaction of n-amylchloride and sodium dispersant, 80 mols toluene and 15 liters n-hexane was charged in a dry nitrogen atmosphere to a 25 liter pressure reactor and stirred therein at 30°C for a period of three hours. A mixture of 1.0 kilograms of butadiene and styrene (equivalent mols) was added at a time, followed by charge of additional 9.0 killograms of butadiene and styrene in equivalent mols at a temperature of 40°C over a period of two and half hours at constant speed. The polymerization reaction was terminated by adding 200 grams methanol to the polymer solution, whereupon carbonic gas was injected to stirr the polymer solution at 40°C for one hour. The solution was filtrated and distilled thereby producing 7.5 killograms butadiene/styrene copolymer. This copolymer had an average molecular weight of 1,500 and a color of 2 by Gardner.

EXAMPLES IX–XIV

These Examples here are offered to illustrate the discovery that the average molecular weight and viscosity of product polymers are largely dependent upon the concentration of monomer, of initiator and of chain transfer agent employed under a set of reaction conditions. Experiments in each of these Examples were conducted as in Examples II–VI with benzylsodium initiator and toluene chain transfer agent for the polymerization of butadiene. The results of each experiment are illustrated in Table 3 wherein the concentration of monomer is represented by the rate of its charge, i.e., by grams per minute.

liquid polymers of different molecular weight, viz. polymerization degrees, may be obtained at will simply by varying either of initiator concentration, chain transfer agent concentration and monomer concentration or charge rate, and also by holding the concentrations of the two materials constant with that of the remaining material alone varied. Such variations, however, should not go beyond the range advanced hereinabove for each of the three materials, in order to ensure the production of liquid polymers of controlled low molecular weight and desired color.

What is claimed is:

1. A process for the production of conjugated diene liquid polymers having an average of molecular weight controlled in the range of 500–10,000 and low color which comprises polymerizing a conjugated diolefin in the presence of a polymerization initiator represented by the general formula:

$$Ar-CR_1R_2Na$$

where Ar is aryl group, and $R_1$ and $R_2$ are hydrogen or alkyl group, and a chain transfer agent represented by the general formula:

$$A'r-CR_3R_4H$$

where A'r is aryl group, and $R_3$ and $R_4$ are hydrogen or alkyl group, in a polymerization-inert hydrocarbon solvent at the temperature ranging from 0° to 80°C wherein the concentration of said initiator is selected to be in the range of 0.01–0.5 mol per liter of reaction mixture, that of said chain transfer agent in the range of 0.001–30 mols and that of said conjugated diolefin in the range of 5–400 grams.

2. The process as defined in claim 1 wherein said conjugated diolefin is selected from the group consisting of butadiene, 2,3-dimethyl-1,3-butadiene, isoprene and piperylene.

3. The process as defined in claim 1 wherein said organosodium initiator is benzylsodium.

4. The process as defined in claim 1 wherein said transfer agent is selected from the group consisting of toluene, xylenes, ethylbenzene, cumene, mesitylene and durene.

5. The process as defined in claim 1 which further comprises copolymerizing said conjugated diolefin with an anion-polymerization active vinyl monomer.

6. The process as defined in claim 5 wherein said vinyl monomer is styrene.

TABLE 3

| Example No. | —CH₂Na (mol) | —CH₃ (mol) | Solvent (liter) | Butadiene feed rate (g./min.) | Average molecular weight | Viscosity poise (25° C.) | Color (Gardner) |
|---|---|---|---|---|---|---|---|
| IX | 0.1 | 0.1 | 1.5 | 2.06 | 1,900 | 170 | 2 |
| X | 0.1 | 0.1 | 1.5 | 4.12 | 3,500 | 1500 | 1 |
| XI | 0.05 | 0.05 | 1.5 | 2.06 | 4,800 | 2300 | 1 |
| XII | 0.1 | 0.5 | 1.5 | 4.12 | 960 | 45 | 2– |
| XIII | 0.1 | 0.7 | 1.5 | 4.12 | 850 | 25 | 2 |
| XIV | 0.05 | 0.5 | 1.5 | 2.06 | 1,200 | 70 | 1 |

It will be understood from Tables 2 and 3 above that

\* \* \* \* \*